(12) United States Patent
Tatarkiewicz et al.

(10) Patent No.: US 11,036,473 B1
(45) Date of Patent: Jun. 15, 2021

(54) APPARATUS, SYSTEMS, AND METHODS FOR BETA DECAY BASED TRUE RANDOM NUMBER GENERATOR

(71) Applicants: Jan Jakub Tatarkiewicz, San Diego, CA (US); Janusz Jerzy Borodzinski, Warsaw (PL); Wieslaw Bohdan Kuzmicz, Warsaw (PL)

(72) Inventors: Jan Jakub Tatarkiewicz, San Diego, CA (US); Janusz Jerzy Borodzinski, Warsaw (PL); Wieslaw Bohdan Kuzmicz, Warsaw (PL)

(73) Assignee: RANDAEMON SP. Z O.O., Warsaw (PL)

( * ) Notice: Subject to any disclaimer, the term of this patent is extended or adjusted under 35 U.S.C. 154(b) by 0 days.

(21) Appl. No.: 17/062,037

(22) Filed: Oct. 2, 2020

Related U.S. Application Data (62) Division of application No. 16/990,087, filed on Aug. 11, 2020, now Pat. No. 10,901,695.

(60) Provisional application No. 63/062,672, filed on Aug. 7, 2020, provisional application No. 62/984,528, filed on Mar. 3, 2020.

(51) Int. Cl.
*G06F 7/58* (2006.01)
(52) U.S. Cl.
CPC .................................... *G06F 7/588* (2013.01)
(58) Field of Classification Search
CPC ...................................................... G06F 7/588
See application file for complete search history.

(56) References Cited

U.S. PATENT DOCUMENTS

| 3,445,591 | A | 5/1969 | Koehler |
| 3,790,768 | A | 2/1974 | Chevalier |
| 4,527,798 | A | 7/1985 | Siekierski |
| 4,855,690 | A | 8/1989 | Dias |
| 4,905,176 | A | 2/1990 | Schulz |
| 5,570,307 | A | 10/1996 | Takahshi |
| 5,627,894 | A | 5/1997 | Albert |

(Continued)

FOREIGN PATENT DOCUMENTS

| WO | 2014080272 | 5/2014 | |
| WO | WQ-2014080272 A1 * | 5/2014 | ............. G06F 7/588 |

OTHER PUBLICATIONS

S. Burri, D. Stucki, Y. Maruyama, C. Bruschini, E. Charbon and F. Regazzoni, "SPADs for quantum random number generators and beyond," 2014 19th Asia and South Pacific Design Automation Conference (ASP-DAC), Singapore, 2014, pp. 788-794, doi: 10.1109/ ASPDAC.2014.6742986. (Year: 2014).*

(Continued)

*Primary Examiner* — Aimee Li
*Assistant Examiner* — Carlo Waje
(74) *Attorney, Agent, or Firm* — Manuel de la Cerra (57) ABSTRACT

Disclosed herein is a true random number generator (TRNG). The TRNG includes an enclosure defining a cavity and a cap covering the cavity and having a cap surface exposed to the cavity, the cap surface including radioactive nickel. An electronic sensor within a cavity detects electrons from the decay of the nickel and produces a signal for the detected energy. An amplifier is connected to the sensor and constructed to amplify the signal and feeds the signal to a filter. A processor connected to the filter generates a true random number based on the signal. This TRNG may be formed on an integrated circuit.

7 Claims, 7 Drawing Sheets

(56) References Cited

U.S. PATENT DOCUMENTS

| | | | |
|---|---|---|---|
| 5,732,138 | A | 3/1998 | Noll |
| 5,987,483 | A | 11/1999 | Edelkind |
| 6,249,009 | B1 | 6/2001 | Kim |
| 8,001,054 | B1 | 8/2001 | Peart |
| 6,346,700 | B1 | 2/2002 | Cunningham |
| 6,415,309 | B1 | 7/2002 | Shilton |
| 6,430,170 | B1 | 8/2002 | Saints |
| 6,539,410 | B1 | 3/2003 | Klass |
| 6,542,014 | B1 | 4/2003 | Saito |
| 6,687,721 | B1 | 2/2004 | Wells |
| 6,697,829 | B1 | 2/2004 | Shilton |
| 6,745,217 | B2 | 6/2004 | Figotin |
| 7,031,991 | B2 | 4/2006 | Hars |
| 7,124,157 | B2 | 10/2006 | Ikake |
| 7,476,370 | B2 | 1/2009 | Mitsugashira |
| 7,519,641 | B2 * | 4/2009 | Ribordy ............... G06F 7/588 708/255 |
| 8,001,168 | B2 | 8/2011 | Tsuyuzaki |
| 8,037,117 | B2 | 10/2011 | Saito |
| 8,234,322 | B2 * | 7/2012 | Saito .................. G06F 7/588 708/250 |
| 9,335,972 | B2 | 5/2016 | Yang |
| 10,146,508 | B2 * | 12/2018 | Pavesi ................ G06F 7/588 |
| 10,225,082 | B2 * | 3/2019 | Cheng ................ G06F 21/72 |
| 10,430,161 | B1 * | 10/2019 | Tatarkiewicz .......... G06F 7/588 |
| 10,901,695 | B1 * | 1/2021 | Tatarkiewicz .......... G06F 7/588 |
| 2003/0018674 | A1 * | 1/2003 | Figotin ................ G06F 7/588 708/250 |
| 2003/0050943 | A1 * | 3/2003 | Ikeda .................. G06F 7/588 708/3 |
| 2004/0139132 | A1 * | 7/2004 | Lutkenhaus ............ G06F 7/588 708/250 |
| 2006/0010182 | A1 * | 1/2006 | Altepeter ................ G06F 7/58 708/250 |
| 2012/0030268 | A1 | 2/2012 | Liu |
| 2015/0261502 | A1 * | 9/2015 | Sartor ................ G06F 7/588 359/107 |
| 2018/0217817 | A1 | 8/2018 | Gorfinkle |
| 2019/0205100 | A1 * | 7/2019 | Massari ............... H04L 9/0852 |
| 2019/0347076 | A1 * | 11/2019 | Park .................. G06F 7/588 |
| 2020/0092328 | A1 * | 3/2020 | Kim ................... H04L 9/088 |
| 2020/0326911 | A1 * | 10/2020 | Topaloglu ............. G06F 7/588 |
| 2020/0326912 | A1 * | 10/2020 | Park .................. G06F 7/588 |

OTHER PUBLICATIONS

Duggirala R., Lal A., Radhakrishnan S. (2010) Radioisotope Decay Rate Based Counting Clock. In: Radioisotope Thin-Film Powered Microsystems. MEMS Reference Shelf, vol. 6. Springer, New York, NY. https://doi.org/10.1007/978-1-4419-6763-3_7 (Year: 2010).*

Collantes et al. "Quantum Random Number Generators", 2016 Retrieved from the Internet <https://arxiv.org/pdf/1604.03304.pdf> (Year: 2016).*

Rohe, "RANDy—A True-Random Generator Based On Radioactive Decay", 2003. Retrieved from the Internet <https://citeseerx.ist.psu.edu/viewdoc/download?doi=10.1.1.110.9725&rep=rep1&type=pdf> (Year: 2003).*

FIFO Architecture, Functions, and Applications, 1999. Retrieved from the Internet <https://www.ti.com/lit/an/scaa042a/scaa042a.pdf> (Year: 1999).*

Advanced Encryption Standard (AES), 2001. Retrieved from the Internet <https://nvlpubs.nist.gov/nistpubs/FIPS/NIST.FIPS.197.pdf> (Year: 2001).*

Walker, J. on "How HotBits Work". Retrieved on [Nov. 9, 2020], Retrieved from the Internet <https://www.fourmilab.ch/hotbits/how3.html> (Year: 2019).*

International Search Report and Written Opinion for PCT/US2019/017748 dated Dec. 30, 2019 (6 pages).

Advanced Encryption Standard (AES), 2001. Retrieved from the Internet. <https:I/nvIpubs.nist.gov/nistpubs/FIPSISIST.FIPS.197 .pdC>(Year:2001).

Fifo Architecture, Functions, and Application, 1999 Retrieved from the Internet <https:1Iwww.ti.com/lit/an/scaa042a/scaa042.pdf>(Year: 1999).

S. Bini, D. Stucki, Y. Maruyama, C Bruschini, E Charbon and F, Regazzoni, "SPADs for quantum randon number generators and beyond, "2014 19th Asia South Pacific Design Automation Conference (ASP-DAC), Singapore, 2014, pp. 788-794, doi: 10.11091 ASPDAC.2014.6742986. (Year:2014) Singapore.

Duggirala R., Lal A, Radhakrishana S. (2010) Radioisotope Decay Rate Based Counting Clock. In Radioisotope Thin-Film Powered Microsystems : MEMS Reference Shelf, vol6. Springer, New York, NY. https:lldoi.orglIO.1007/978-1-4419-6763-3_7 (Year:20 16) vol. 6. Springer, New York, NY.

Collantes et al. "Quantum Random No. Generators", 2016 Retrieved from the Internet <https:llarxiv.orglpdf/1604.03304.pdf>(Year:20 16).

Rohe, "RANDy-A True-Random Generator Based on Radioactive Decay", 2003. Retrieved from the Internet <https:llciteseerx.ist.psu.edu/viewdoc/download? = I 0:1.1.11 0.9725&rep=rep I &type=pdf>(Year:2003).

International Search Report for PCT/US2020/065976 dated Feb. 19, 2021.

* cited by examiner

FIG 4
Method 300

APPARATUS, SYSTEMS, AND METHODS FOR BETA DECAY BASED TRUE RANDOM NUMBER GENERATOR

PRIORITY APPLICATIONS

This application claims priority to U.S. Provisional Application Ser. 62/984,528 filed on Mar. 3, 2020, titled "Method And Apparatus For Tritium-Based True Random Number Generator", to U.S. Provisional Application Ser. 63/062,672 filed on Aug. 7, 2020, titled "Method And Apparatus For Beta Decay Based True Random Generator", and as a divisional of U.S. application Ser. No. 16/990,087 filed on Aug. 11, 2020 titled, "Apparatus, Systems, And Methods For Beta Decay Based True Random Number Generator".

This application is also related to U.S. Provisional Application Ser. 62/655,172 filed on Apr. 9, 2018, titled "Apparatus, Systems, And Methods Comprising Tritium Random Number Generator", to U.S. Provisional Application Ser. 62/803,476 filed on Feb. 9, 2019, titled "Apparatus, Systems, And Methods Comprising Tritium Random Number Generator", and to U.S. application Ser. No. 16/273,365 filed on Feb. 12, 2019, titled "Apparatus, Systems, And Methods Comprising Tritium Random Number Generator", now U.S. Pat. No. 10,430,161.

Each of the patent applications, issued patents and other references discussed and/or cited herein is incorporated by reference as if fully set forth herein.

TECHNICAL FIELD

The present disclosure relates generally to true random number generators, and more specifically to random number generator technologies utilizing the spontaneous nickel isotope decay, as well as to apparatus, systems, and methods regarding same.

BACKGROUND

As opposed to pseudo random number generators based on numerical algorithms, there are true random number generator (TRNG) devices that depend on natural random processes: multiple bipolar switches, thermal noise, light scattering by dichroic mirrors, chaotic systems, and decay of radioactive nuclei. Some of these TRNG are listed in the provisional applications to which the present application claims priority, and those references are incorporated herein by reference as if fully set forth herein.

The decay of radioactive nuclei types is considered to be the most independent from environmental influences like temperature, pressure or acceleration. However, typical nuclear-based TRNGs require large size detectors to enable registration of particles emitted as a result of radioactive decays. Also, many nuclei used in such devices are highly radioactive and poisonous, hence dangerous to humans if the device is broken.

Therefore, a safe and small TRNG that will not expose the user to dangerous levels of radiation would be advantageous. Such a TRNG can then be used in compact personal devices.

SUMMARY

The invention disclosed herein is a true random number generator (TRNG). The TRNG includes an enclosure defining a cavity and a cap covering the cavity and having a cap surface exposed to the cavity, the cap surface including radioactive nickel. An electronic sensor detects electrons within the cavity from the decay of the nickel and produces a signal for the detected energy. An amplifier is connected to the sensor and is constructed to amplify the signal and then feeds the signal to a filter. A processor connected to the filter generates a true random number based on the signal. The true random number may be comprised of 256 bits, 512 bits or some other number of bits as required by an application.

The processor may be constructed to perform the following steps: (a) determine whether the signal represents decay events for nickel; (b) set a timer to determine the time period between several decay events; (c) based on the time periods in step (b), assign a value of a 0 or a 1; (d) store the value in a memory; (e) repeat steps (b)-(d) to result in a string of values; and (f) generate a true random number based on the string of values. Step (b) may further include determining a first time period T1 between a first pair of decay events and a second time period T2 between a second pair of decay events, in which case step (c) compares T1 to T2 and assigns the value based on the comparison of time lengths. The first pair of decay events and the second pair of decay events may share a common decay event. The processor may generate an array of true random numbers and may provide the array to a cryptographical client and then delete the delivered true random number from the memory.

The cavity, sensor, amplifier, filter, and processor are formed on an integrated circuit (IC). The nickel may be a result of salt electroplating of nickel on the cap. The amount of nickel is preferably sufficient to create at least one million decay events per second. The TNRG may include a timer with a clock frequency of at least 1 GHz. The amplifier may be a low noise charge-sensitive preamplifier or a pulse shaping amplifier.

The electronic sensor may be a sensor array, and the processor may perform the following steps: (a) assigning a 0 or a 1 based on the detection of electrons by some sensors (pixels) in the array (0 corresponds to no detection while 1 corresponds to detection of at least one electron); and (b) generating an array of true random numbers based on step (d) below. The processor may perform the following entropy adjustment sub-steps: (c) setting the reading rate of the sensors; (d) comparing the number of 0s reported by the sensor array to the number of 1s reported by the sensor array; and (e) adjusting the reading rate based on the comparison in step (d) so that numbers of 0s and 1s are equal within statistical error.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with FIGS. 1-4 and is provided for ease of reference, where like reference numerals designate corresponding features throughout the specification and figures:

Packaged Integrated Circuit with Detector 5
Substrate with IC 10
Cap 15
Cap Surface 17
IC Enclosure 20
Cavity 22
IC Base 25
Radioactive Material 30
Masking 35
Masking Window or Void 40
Radioactivity Detector/Sensor 45
Amplifier 210
Filter 215
Processor 220
Signal Processor 225
Timer 230
Memory 235
Cryptographical Client 240
Method Used with Array of Detectors 300

As opposed to pseudo random number generators based on numerical algorithms, there are many true random number generator (TRNG) devices that depend on natural random processes: multiple bipolar switches, thermal noise, light scattering by dichroic mirrors, chaotic systems, decay of radioactive nuclei. The latter group is considered to be the most independent from environmental influences like temperature, pressure or acceleration. However, typical nuclear-based TRNGs require large size detectors to enable registration of particles emitted as a result of radioactive decays. Also, many nuclei used in such devices are highly radioactive and poisonous, hence dangerous to humans if device is broken.

Various example embodiments of the present apparatus, systems, and methods demonstrate that by using gaseous tritium paired with suitable solid-state detector one can make a very compact device that can be incorporated into integrated circuit chip. Because of small amounts of radioactive material deployed, such an IC can be used inside consumer products like cell phones without endangering people even if the device is destroyed and radioactive material is released. Analog and digital circuits that need to be incorporated into proposed design of TRNG on IC chip can be easily manufactured with standard epitaxial, implantation and laser annealing procedures used throughout industry that makes solid state devices.

Various example embodiments of the present apparatus, systems, and methods demonstrate that ICs can be impregnated with a radioactive material during manufacturing. See, e.g., FIGS. 1A-1D. Even with a very small amount of radioactive nickel, each such chip can generate many thousands of random bits per second. Then these bits can be stored for later use in solid state memory incorporated inside the IC. Thus, such a standalone TRNG on chip can easily provide on demand thousands of multi-byte random numbers needed for encryption of communication channels (like voice or text messages) or for processes requiring plenty of random numbers (like simulations or gaming).

In the related patent, U.S. Pat. No. 10,430,161 entitled "Apparatus, Systems, And Methods Comprising Tritium Random Number Generator", the general idea of using gaseous tritium as a medium randomly generating nuclear decays that are detected by the on-chip electronic sensor is described. By measuring and comparing time delays between two pairs of such decays, random numbers (bits) are generated.

In this application, a different type of beta decay is disclosed. Searching the BIPM "Tables of Radionuclides", only two nuclides were discovered that produce pure beta-minus decay (emission of an electron) in the range of energies below 512 keV and having reasonable half-life times of more than ten years. See M.-M. Be et al. 2008 Bureau International des Poids et Mesures, Sevres (France)

BIPM-5 vol. 1-4 "Table of Radionucléides". The limitations are of interest because the generation of gamma rays by highly energetic electrons cannot be easily shielded, since gamma rays penetrate typical materials used for enclosures, while short-lived isotopes are not suitable for the manufacturing of integrated circuits that can be used for longer than just a few years. Tritium, which we described as the source of randomness in U.S. Pat. No. 10,430,161, is one of the number of such nuclides, having an average energy of emitted electrons of about 5.7 keV (max energy about 18 keV) and a half-life time of about 12.3 years (about 4500 days). The problem with that isotope is that its gaseous form is very permeable and is hence hard to contain. In the related provisional U.S. Application Ser. 62/984,528 entitled "Method And Apparatus For A Tritium-Based True Random Number Generator", the use of tritiated water is disclosed, possibly in the form of a gel that can be used to cover a radiation detector.

Another nuclide found in our search that fulfills the criteria is Nickel isotope with atomic number 63 (symbol $^{63}$Ni). This isotope also emits only low energy electrons (average energy 17.4 keV, max energy about 67 keV) and has a half-life time of about 98.7 years. This nuclide decays to a stable $^{63}$Cu, and it is produced by bombarding $^{62}$Ni with neutrons, typically inside a nuclear reactor. The natural abundance of $^{62}$Ni is about 3.6%. Hence, it is possible to have this isotope enriched by e.g. centrifugation before neutron irradiation, thus making production relatively easy, cf. D. F. Williams et al. 1993 Oak Ridge National Laboratory TM-12399 "Recovery and Purification of Nickel-63 from HFIR-irradiated Targets". $^{63}$Ni is available commercially, since it is used as a standard for calibration of medical and other beta detectors. Such standards are manufactured with different radioactivities by depositing thin layers containing nickel on various materials. Having $^{63}$Ni as a salt (e.g. nickel chloride) allows for covering metal parts (foils, plates) with a precise amount of radionuclide by controlling the thickness of an electroplated nickel (current and time process control). All the above suggests that $^{63}$Ni is a perfect candidate for a radiation source to be used in a true random number generator built into an integrated circuit.

The natural radioactivity of 1 mol of $^{63}$Ni weighting 63 grams is half of the Avogadro's number over 98.7 years, or about $3 \times 10^{23}$ decays in $3.1 \times 10^9$ seconds, or about $10^{14}$ decays per second. Since the density of nickel is about 8.9 g/cm$^3$, the volume of $^{63}$Ni needed to obtain 1 million decays per second, a number considered practical for a true random number generator, is less than 0.65 micrograms. These calculations do not include the geometric factor applied later on due to radiation being emitted in the whole sphere around each nuclei. With the market cost of 1 gram of $^{63}$Ni being less than $100,000.00, the amount of $^{63}$Ni needed for the above-mentioned number of 1 million decays per second will cost less than $0.07. The dose of radiation received by a human person (if all that amount of nickel is digested and absorbed by the body) is equal to about 23% of US natural background dose (about 0.7 mSv/year vs. 3.1 mSv/year for US natural background). This makes TRNG based on $^{63}$Ni made as per this patent application very safe indeed. These numbers are presented in the Appendix. This is encouraging because a very small amount of metallic nickel-63 is required for each random number generator, and that will make manufacturing cost-effective and simple.

Figure 1A:
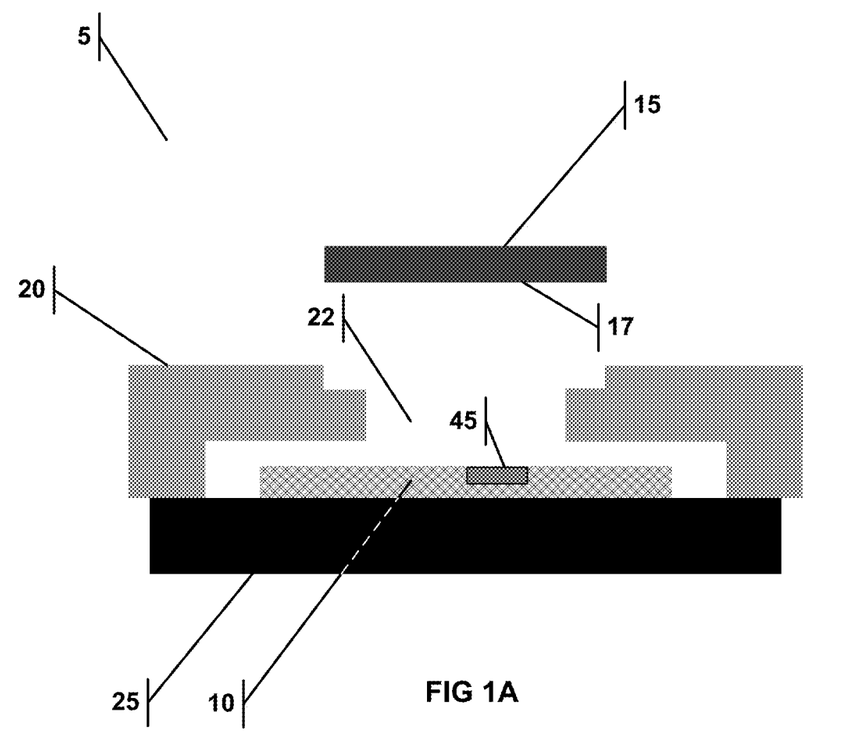
FIG. 1A is a cross-sectional view of a beta-decay detector in an enclosure, with a cap.
Figure 1B:
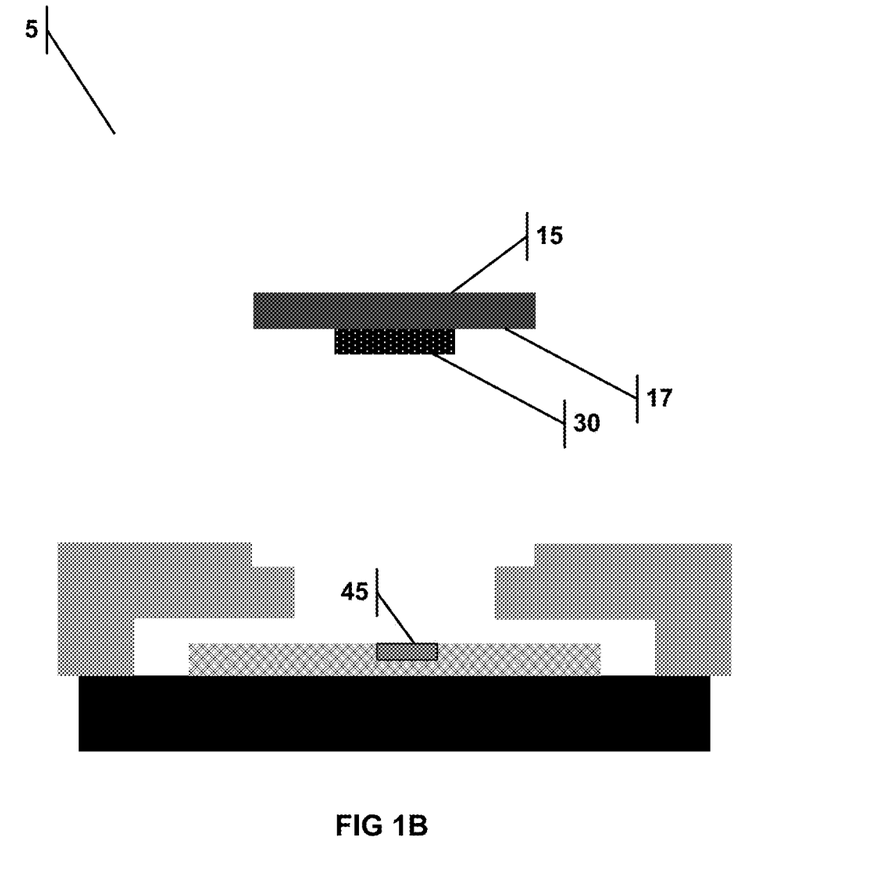
FIG. 1B is a cross-sectional view of a beta-decay detector, with a cap containing radioactive material.
Figure 1C:
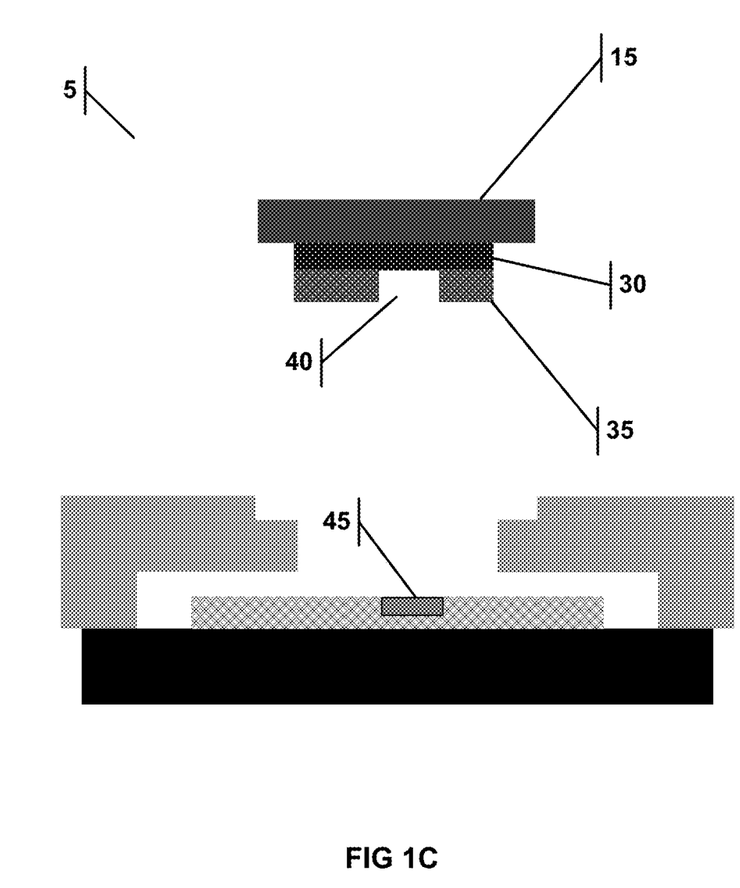
FIG. 1C is a cross-sectional view of a beta-decay detector, with a cap containing radioactive material and a mask shielding some part of radioactive material.
Figure 1D:
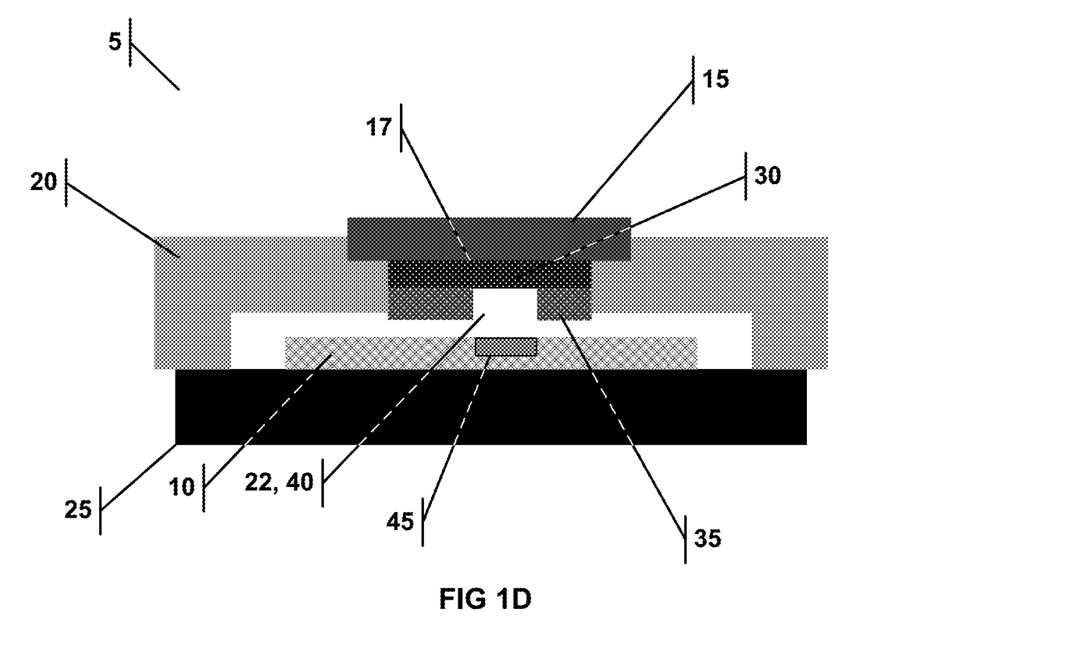
FIG. 1D is a cross-sectional view of a beta-decay detector fully assembled.

Electrons emitted in the spontaneous decay of $^{63}$Ni that have on average the energy of 17.4 keV can be easily detected by PIN diode (P and N regions being heavily doped semiconductors with intrinsic semiconductor region sandwiched between them) or by typical CCD (Charge-Coupled Device) circuit; both these devices can be easily incorporated in a design on specialized IC with TRNG. FIG. 1A illustrates such a packaged IC design 5 that includes an enclosure 20 that defines a cavity 22, and a cap 15 covering the cavity 22. The IC includes an IC base 25, a substrate with IC 10, and a detector/sensor 45. The cap 15 has a surface 17 that is exposed to the cavity 22. As shown in FIG. 1B, the cap 15 has a cap surface 17 that includes a radioactive material 30. The detector/sensor 45 detects electrons within the cavity 22 stemming from the decay of the radioactive material 30 and produces a signal for the detected energy. This detector/sensor 45 may be a PIN diode formed by the N-type silicon and P-type silicon on an intrinsic silicon substrate. A CCD may also be used as the detector. Other types of electronic sensors may be used, including, as a non-limiting example, a CMOS electronic sensor. FIG. 1D illustrates the assembled packaged integrated circuit 5.

The cap 15 may be made from any metal, electroplated to the desired radioactivity on one side, and prepared at the very end of the manufacturing process. This allows for different components to be assembled in different manufacturing plants and to be put together quickly in the last stages of IC manufacturing. The cap 15 covered with an amount of nickel 30 emitting about 1 million electrons every second will not be harmful to humans even though electrons emitted from such a source have larger energies than those emitted by tritium. Such a source will have an activity of about 0.27 µCi. 18 keV electrons are completely stopped by the outer part of the skin (10 to 40 microns thick). See M. J. Berger and S. M. Seltzer 1982 National Bureau of Standards NBSIR 82-2550 "Stopping Powers and Ranges of Electrons and Positrons". The introduction of radionuclides inside the body (like swallowing the cap) would result in a very mild radiation hazard that would amount to the dose of about 70 mrem—Annual Limit for Intake (ALI) is about 5 rem. See Appendix B to 10 CFR Part 20 www.nrc.gov/reading-rm/doccollections/cfr/part020/part020-appb.html.

The range of 17.4 keV electrons in the air (or in some other inert gas like nitrogen) is about 6 mm, hence the cap 15 with the radioactive material 30 does not need to be touching the substrate 10 of the IC 5 or the detector 45. It is sufficient to separate the radioactive material 30 from the detector 45 by a distance of less than about 1 mm, and still most of the emitted electrons will hit the detector. By varying the thickness of the electroplated nickel, the number of decays per second can be easily controlled. The area of the detector can also control this number. For example, a detector with an area of 0.56 mm$^2$ (e.g. 750 microns by 750 microns PIN diode with a surface that can be partially covered with an electron-blocking mask if the production requires it to be larger) and an active layer of about 2 microns of $^{63}$Ni would produce more than 1 million counts per second if the geometric factor of about 0.07 is considered due to electrons flux being emitted into a full sphere around each nucleus. Due to the absorption of electrons in the electron-producing material, only a fraction of electrons emitted into a conical section of about 30° would be able to reach the detector 45, which is a flat surface outside of the sphere of emission. We used the formula for the fraction of the surface of a spherical sector of the sphere with the angle Φ measured from the center of the cone to its side:

$$(1-\cos \Phi)/2 \qquad \text{Eq. 1.}$$

To prevent radiation damage of the integrated circuit that contains an embedded detector, the area of $^{63}$Ni that can emit electrons may be limited so that only electrons destined to reach the detector will be open, while other portions of the $^{63}$Ni layer on the cap will be covered by at least 100 microns of a masking material that absorbs electrons with energies smaller than 100 keV or so. Such a modification of the cap is presented in FIG. 1C. The cap 15 has a layer of radioactive material 30 and a masking 35, with a window or void 40 that corresponds to the area covered by the detector 45. The masking 35 can be easily manufactured by either selectively spraying paint or by attaching a piece of foil with a void 40. By carefully placing such a mask over the radioactive material 30 deposited on the cap 15, the radiation exposure of other parts of the integrated circuit can be limited, especially if a passive area will be left around the detector 45. An accuracy of about 0.25 mm will be enough in such a construction to effectively shield the rest of the integrated circuit from the electrons emitted by the source of randomness.

Figure 2:
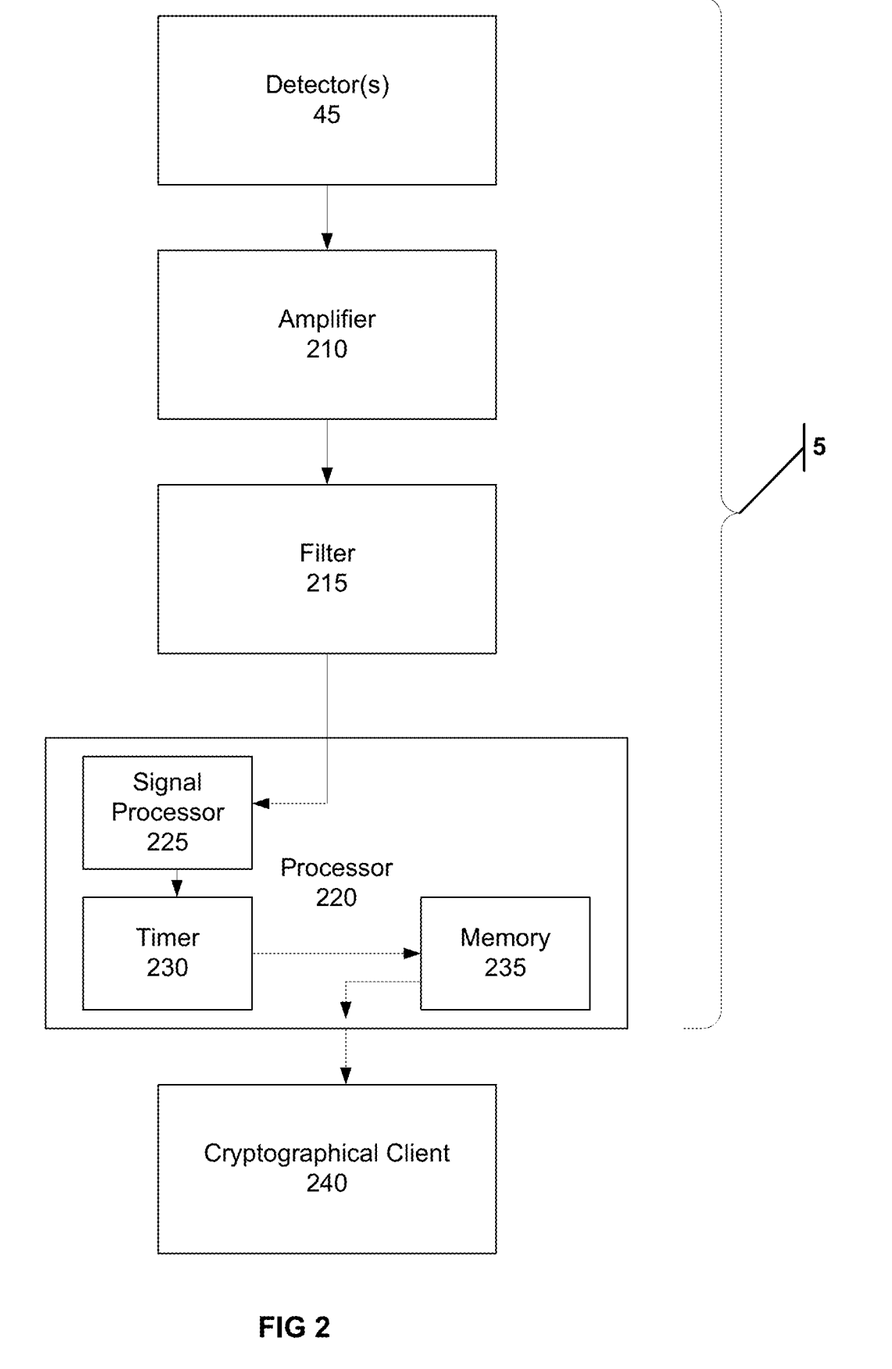
FIG. 2 is a flow diagram of the various components that may be place on the integrated circuit.

The detector 45 may be included on an IC 5, which may further include an amplifier 210 (such as a low noise charge-sensitive preamplifier and pulse shaping amplifier), a filter 215, and a processor 220, as shown in FIG. 2. A cryptographical client 240 may optionally also be on the IC.

Figure 3A:
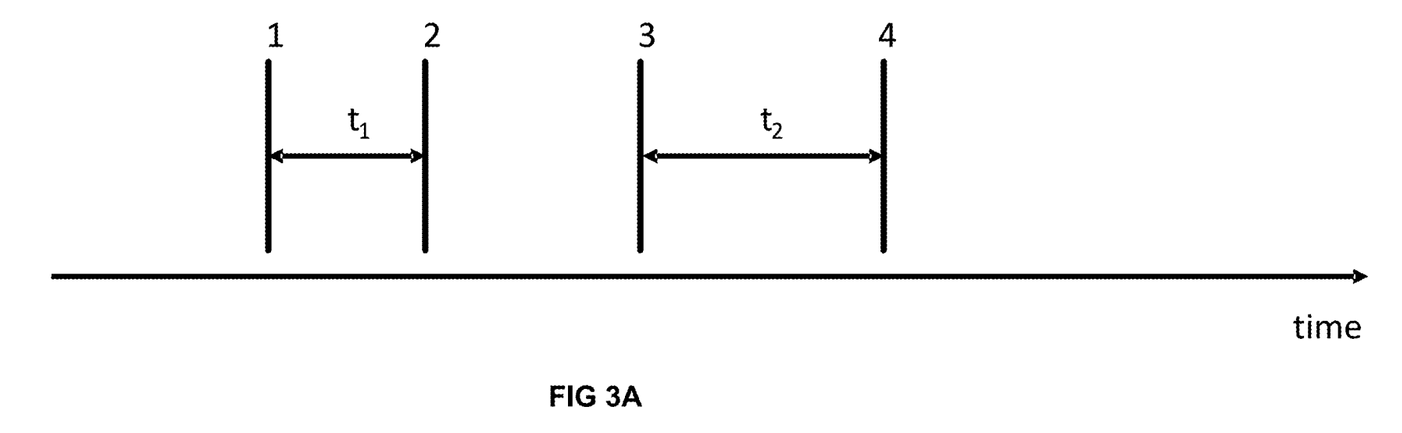
FIG. 3A illustrates the four pulse per random bit schema.

The following is a method for converting random nickel decays resulting in emission of electrons sensed by PIN diode or sensed by a CCD-type built-in on-chip detector 45 (discussed above) into a true random number:

1. After each decay of a nickel nuclei, one electron with an average energy of about 17.4 KeV is emitted.
2. Each such electron creates a pulse of electrons in the detector 45 with a very typical time profile that enables detection of just that event and not the other possible types of energetic ionizing particles hitting the detector 45.
3. The analog pulse from the detector 45 is amplified by the amplifier 210. The amplifier 210 may have a pre-amplifier.
4. The amplified signal from the amplifier 210 is filtered by the digital filter 215.
5. The filtered signal is processed by the processor 220 to determine if the signal corresponds to the electron emitted in a decay of nickel and not by other energetic ionizing particle(s). The processor 220 may include a signal processor 225 that performs this function.
6. If the signal is indeed an electron emitted in the decay, then the processor 220 starts a timer 230, which may also be part of the processor 220. The timer 230 may optimally be at a clock frequency of the order of several GHz (several times $10^9$ per second). Because electron pulses will be detected on average every microsecond ($10^{-6}$ seconds or between on average several thousand clock ticks), one would have enough accuracy to detect differences of randomness of appearances of pulses in time.
7. Steps 1-6 are repeated to detect a second pulse from subsequent decay, which triggers the processor 220 to stop the timer 230.
8. The value of the timer 230 is stored in the memory 235. This is shown as T1 in FIG. 3A.
9. The next two pulses result in another timer value (T2; FIG. 3A) to be stored into the memory 235. To generate T1 and T2, four pulses are used in FIG. 3A.
10. Two numbers (T1 and T2) stored in memories are compared—if first is larger, then the system creates a bit with the value 1; in the other case the value is zero (0). (This schema can be inverted as well). These bit values are stored into the memory 235. In the very rare situation that the two numbers (T1, T2) are exactly same, the whole sequence is discarded. So for each random bit, four pulses are used.
11. Steps 1-10 are repeated, typically several hundred thousand times per second.
12. The system generates multibyte numbers, typically 256 bits or 512 bits long, and these are stored in the memory bank for further use by the cryptographical client 240 of the chip, providing long (large) random numbers needed for the encryption of communication channels.
13. After a number is used by the cryptographical client 240, the FILO system (first in, last out) moves to the other number while the process described above adds more numbers to the memory 235 until it is filled. In such case of filling the whole memory bank, numbers kept longest in the memory 235 are expunged to make space for new numbers generated by the system. This capability makes the system much more resistant against hacking etc.

Figure 3B:
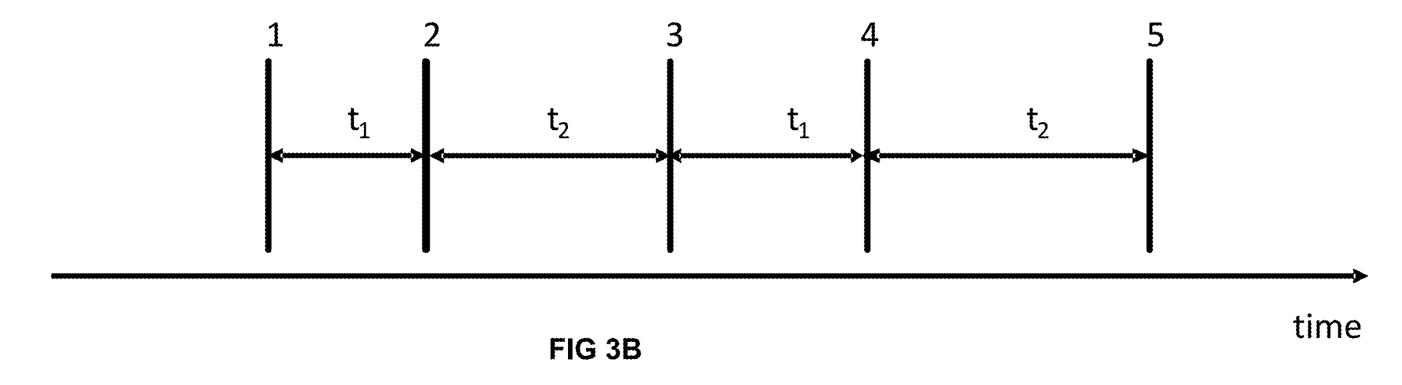
FIG. 3B illustrates the two pulse per random bit schema.

It should be noted that the system may not use four pulses per random bit. Instead, the system may be constructed as shown in FIG. 3B, where the timer resets at each pulse detection and is always counting. The benefit to this system is it only requires three pulses per random bit. But the two time periods are somewhat dependent on each other because they are linked by a pulse event, so the resulting string of bits may not be as random as the schema provided in FIG. 3A, and it may require randomization; see below.

To increase the efficiency of random number generation and to use simple electronic components, instead of measuring and comparing the time between detection of two pairs of electrons, it was suggested by several authors, including Patuleanu et al. 2017 Proc. Romanian Acad. series A, vol. 18, 389-402 "True Random Number Sequences From Gamma-Decay Using Four Extraction Methods", that measuring random times between two successive decays can produce 3 bits from the least significant digits of the measurement. This means that from one million decays per second about 1.5 Mbits per second of randomness can be extracted. The actual number of generated bits will be lower due to the randomization procedure, cf. J. von Neumann 1951 Res. Nat. Bur. Stand. Appl. Math. Series 3, 36-38 "Various Techniques Used In Connection With Random Digits", that is necessary to remove possible bias resulting from the dead time of the system counting events and other non-random processes involved. The modern version of this normalization uses three bits instead of two, thus increasing the efficiency of the process. See, e.g., B. Škorić 2015 Lecture notes 2IMS10 Technical University Eindhoven (Holland) "Physical Aspects Of Digital Security".

Instead of using a single detector, the integrated circuit 5 may include an array of detectors, akin to a typical CCD optical matrix. The system may implement entropy adjustment sub-steps/method 300 in FIG. 4 to read the state of all pixels of such an array, and, from that reading, to create a random number. For example, the integrated circuit 5 may have a detector 45 with a 10×10 array, capable of producing a 100 bit number. Random numbers may be generated directly from this array without the need of timing schema just discussed. The processor would assign a 1 or a 0 based on the signal received from each sensor in the array (electron hit or not), and those values can be strung together to generate an array of true random numbers. The process is like randomly dropping sand grains on the checkerboard.

But to ensure that the array-based TRNG is indeed random and has an optimal entropy, the system should confirm that the pixels are reporting 0 and 1 hits at the same probability of 50% to maximally increase entropy. In other words, adding all the is in a 10×10 array should on average equal 50, and adding all the 0s should also on average equal 50. If the reporting is not at the 50/50 optimal threshold, then the system can increase or decrease registration time (decreasing or increasing the number of readings per second; the exposure time changes inversely, i.e. increasing number of readings decreases exposure time and vice versa). In this scheme, multiple hits of electrons of the same pixel will still count as one hit.

Figure 4:
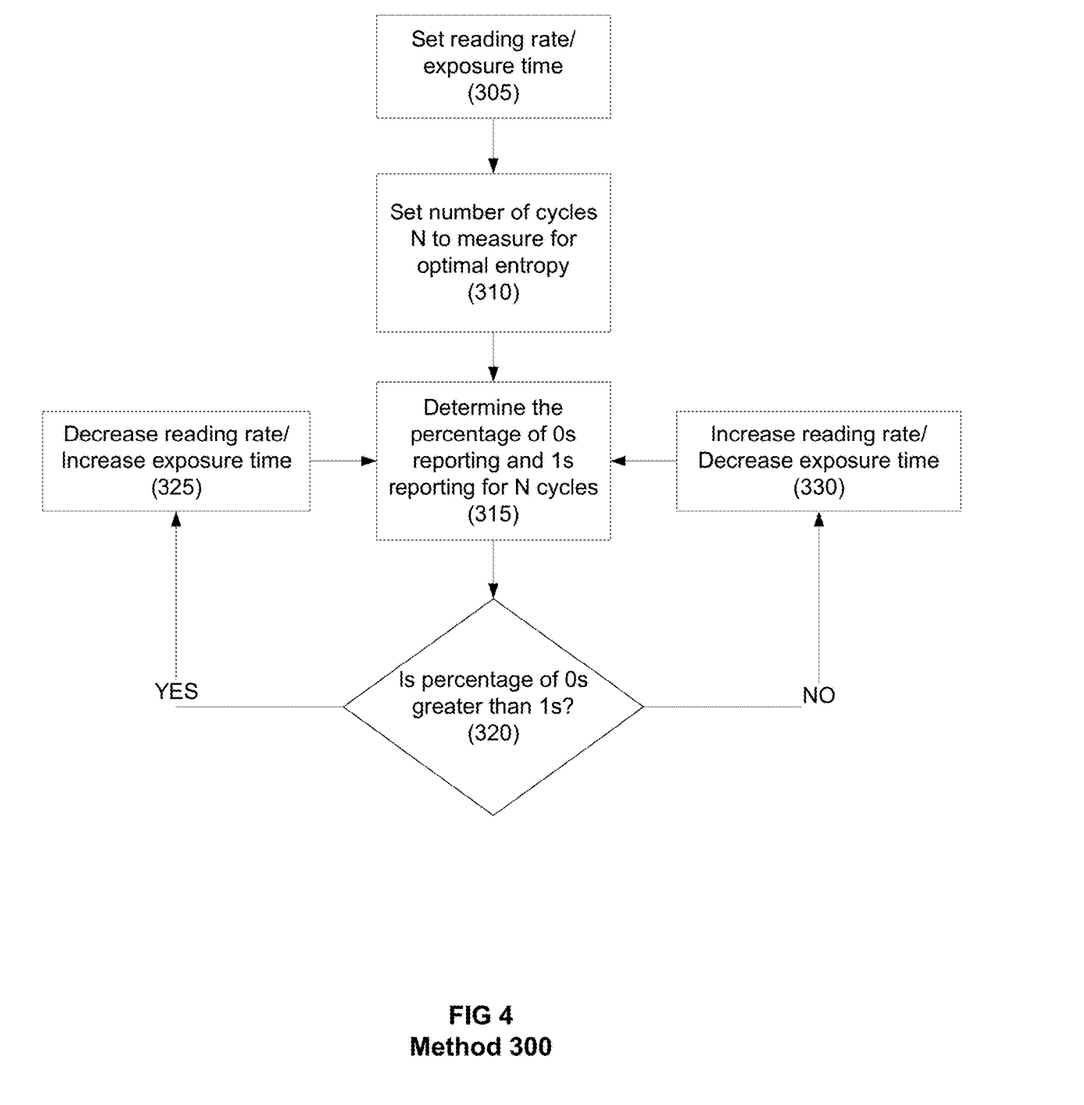
FIG. 4 illustrates an entropy adjustment sub-steps/method used with an array-based detector.

This method 300 of self-adjustment may be implemented in the processor 220: if the number of zeroes in a given readout is smaller than half of the total number of detectors used, then the system should increase the reading time (lower number of readings per second) and, conversely, if the number of zeros larger than half of the total number of the detectors, this will result in shortening of the reading time (more readings per second). Such a feed-back method should converge quickly, thus wasting only a few reading cycles due to a random rate of decays that is constant with an average over time of several reading cycles, hence producing high-quality bits in a simple system that does not need a very accurate clock and pulse detection.

The method 300 first sets a reading rate/exposure time 305, and then sets a number of cycles 310 that will be used for quality control. From the readings within the cycle, the 0's are summed and compared to the sum of 1's in step 315. Ideally these numbers should be the same, but if they deviate with the percentage of 0s begin greater than 1s, then the system increases the reading rate/exposure time in step 325 by a similar percentage. Otherwise the system decreases the reading rate/exposure time in step 330.

The memory can supply the necessary number of bytes (bits) on demand for e.g. secure random encryption of communication channels (i.e., cryptographical client 240) of the device in which this specialized IC is mounted or for random processes required by simulations, modeling and gaming. Additional software testing of random number sequences, like method 300, may be built into IC chip to allow for real time quality control of random character of bits generated. If parts of the sequence do not pass test(s), such a sequence would be removed and never used as an output, or, as in the method 300, the reading rate of the detector can be adjusted to maintain optimal entropy. This type of proofing further improves the random character of the sequences that are being generated by the chip.

Various example embodiments of the present apparatus, systems, and methods provide the ability to manufacture TRNG ICs on the standard semiconductor production line, the only difference being that the packaging should leave as calculated above the detector of the size of about 0.5 mm² and a cap of the enclosure with electroplated nickel-63 shielded by the mask with the similar shape and positioned over detector. Otherwise, the produced ICs will be very similar in design and other characteristics to other ICs typically used in the manufacturing of consumer goods because electrons emitted during decay of nickel will not be able to penetrate protective materials on IC. The range of 18 keV electrons in a material like plastic is less than 3 micrometers. The packaging will be shielding the embedded detector from any external radiation of comparable or even much higher energies. Even if such high energy particles will pass through the packaging enclosure, they will generate different type of pulses, and these can be differentiated by filtering from 18 keV pulses that are being used to generate random numbers.

Any of the suitable technologies, materials, and designs set forth and incorporated herein may be used to implement various example aspects of the invention, as would be apparent to one of skill in the art.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

APPENDIX

| | |
|---|---|
| Density of $^{63}$Ni | 63 g/mol |
| Half-life | 98.7 years |
| | 3,112,603,200 sec |
| Need for TRNG | 1,000,000 decays/sec |
| | 1 decay/μsec |
| Radioactivity | 1,000,000 Bq |
| | $2.70 * 10^{-5}$ Ci (with $e^-$ energy 17.4 keV per decay) |
| Dose per body | $2.23 * 10^{-10}$ J/(kg·s) for 80 kg body |
| | $7.02 * 10^{-3}$ Gy/year |
| | 0.70 mSv/year |
| | natural US background $E_{US}$ = 3.1 mSv/year |
| | 23% of US yearly natural background dose (if whole amount of nickel absorbed in body) |
| $^{63}$Ni for $10^6$ decays/sec | $6.51 * 10^{-7}$ g |
| Cost of $^{63}$Ni needed | $0.07 ($^{63}$Ni costs less than $100,000/gram) |
| Detector size | 0.56 mm²      0.75 mm × 0.75 mm |
| Active layer thickness | 2.0 μm |
| Volume of active $^{63}$Ni | 0.0011 mm³ |
| Mass of $^{63}$Ni needed | 10.0 μg |
| Counts | $1.03 * 10^6$ counts/sec with geometrical factor 0.07 included |

The invention claimed is:

1. A method of generating a true random number using radioactive nickel and an electronic sensor, the method comprising:
   a. exposing the electronic sensor to a volume of radioactive nickel;
   b. focusing the exposure of the electronic sensor with a mask positioned between the electronic sensor and the volume of radioactive nickel;
   c. detecting by the electronic sensor, an electron signal from a decay of the radioactive nickel;
   d. determining whether the electron signal represents decay events for radioactive nickel;
   e. setting a timer to determine a time period between decay events;
   f. assigning a value of a 0 or a 1 based on the time period;
   g. storing the value;
   h. repeating steps (c)-(g) resulting in a string of values; and
   i. generating an array of true random numbers based on the string of values.

2. The method of claim 1,
   wherein step (e) further comprises, determining:
      a first time period T1 between a first pair of decay events;

a second time period T2 between a second pair of decay events;

wherein step (f) further comprises comparing T1 to T2 and assigning the value based on the comparison.

3. The method of claim 2, wherein the first pair of decay events and the second pair of decay events share a common decay event.

4. The method of claim 1, the method further comprising:
 j. providing the array of true random numbers to a cryptographical client; and
 k. deleting the provided array of true random numbers.

5. The method of claim 1, wherein the true random number is comprised of 256 bits or 512 bits.

6. A method of generating a true random number using radioactive nickel and an electronic sensor array, the method comprising:
 a. exposing the electronic sensor array to a volume of radioactive nickel;
 b. focusing the exposure of the electronic sensor array with a mask positioned between the electronic sensor array and the volume of radioactive nickel;
 c. detecting by the electronic sensor array at a reading rate an electron signal from a decay of the radioactive nickel;
 d. determining whether the electron signal represents decay events for radioactive nickel;
 e. assigning a 0 or a 1 based on the detection from each electronic sensors in the array; and
 f. generating an array of true random numbers based on step (e).

7. The method of claim 6, further comprising an entropy adjustment sub-method comprising:
 g. comparing the number of 0s assigned by the electronic sensor array to the number of 1s assigned by the electronic sensor array in step (f); and
 h. adjusting the reading rate based on the comparison in step (g).

* * * * *

UNITED STATES PATENT AND TRADEMARK OFFICE
CERTIFICATE OF CORRECTION

PATENT NO. : 11,036,473 B1
APPLICATION NO. : 17/062037
DATED : June 15, 2021
INVENTOR(S) : Jan Jakub Tatarkiewicz, Janusz Jerzy Borodzinski and Wieslaw Bohdan Kuzmicz

Page 1 of 1

It is certified that error appears in the above-identified patent and that said Letters Patent is hereby corrected as shown below:

In the Specification

At Column 9, Line 1, the sentence beginning with "In other words" is replaced with "In other words, adding all the 1s in a 10×10 array should on average equal 50, and adding all the 0s should also on average equal 50."

Signed and Sealed this
Twentieth Day of July, 2021

Drew Hirshfeld
*Performing the Functions and Duties of the*
*Under Secretary of Commerce for Intellectual Property and*
*Director of the United States Patent and Trademark Office*